United States Patent
Tu

(10) Patent No.: US 9,177,467 B2
(45) Date of Patent: Nov. 3, 2015

(54) ELECTRICAL GATEWAY AND COMMUNICATION METHOD OF ELECTRICAL GATEWAY

(71) Applicant: Huawei Device Co., Ltd., Shenzhen, Guangdong (CN)

(72) Inventor: Xiaoming Tu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 123 days.

(21) Appl. No.: 13/727,276

(22) Filed: Dec. 26, 2012

(65) Prior Publication Data

US 2013/0222150 A1  Aug. 29, 2013

Related U.S. Application Data

(63) Continuation of application No. PCT/CN2012/071681, filed on Feb. 27, 2012.

(51) Int. Cl.
*G08C 15/06* (2006.01)
*H04W 88/16* (2009.01)

(52) U.S. Cl.
CPC ............... *G08C 15/06* (2013.01); *H04W 88/16* (2013.01)

(58) Field of Classification Search
CPC ............................ G08C 15/06; H04W 88/16
USPC ................. 340/870.02, 870.11, 870.12, 12.54
See application file for complete search history.

(56) References Cited

U.S. PATENT DOCUMENTS

| 6,861,956 B2 * | 3/2005 | Ying ........................ 340/12.52 |
| 7,277,027 B2 * | 10/2007 | Ehrke et al. .............. 340/870.12 |
| 2007/0234416 A1 | 10/2007 | Matsuoka et al. |

(Continued)

FOREIGN PATENT DOCUMENTS

| CN | 101101699 A | 1/2008 |
| CN | 101315727 A | 12/2008 |

(Continued)

OTHER PUBLICATIONS

1st Office Action in corresponding Chinese Patent Application No. 201280000172.8 (Apr. 3, 2013).

(Continued)

*Primary Examiner* — Tai T Nguyen
(74) *Attorney, Agent, or Firm* — Leydig, Voit & Mayer, Ltd.

(57) ABSTRACT

An electrical gateway and a communication method of the electrical gateway are disclosed. The electrical gateway includes: an uplink communication module, a downlink communication module and a control unit; the uplink communication module is configured to communicate with an uplink network element; the downlink communication module is configured to communicate with a terminal device; and the control unit, connecting the uplink communication module and the downlink communication module, is configured to, when it is determined that downlink data sent by the uplink network element is obtaining terminal device information, transmit the terminal device information to the uplink communication module if the terminal device information is stored in the electrical gateway, and transmit the obtaining the terminal device information to the downlink communication module if the terminal device information is not stored in the electrical gateway. Therefore, data communication is achieved.

17 Claims, 4 Drawing Sheets

(56) References Cited

U.S. PATENT DOCUMENTS

2008/0056261 A1    3/2008  Osborn et al.
2008/0272934 A1*  11/2008  Wang et al. .............. 340/870.11
2009/0187654 A1    7/2009  Raja et al.
2010/0064001 A1    3/2010  Daily

FOREIGN PATENT DOCUMENTS

| CN | 102117537 A | 7/2011 |
| CN | 102741898 A | 10/2012 |
| EP | 0257300 A1 | 3/1988 |
| JP | 2000507707 A | 6/2000 |
| JP | 2010503276 A | 3/2008 |
| JP | 2009260778 A | 11/2009 |
| WO | 9810299 A1 | 3/1998 |

OTHER PUBLICATIONS

Extended European Search Report in corresponding European Patent Application No. 12736422.2 (Aug. 8, 2013).

Quan et al., "Design and Implementation for the Industrial Wireless Gateway of Smart Tunneling," 2010, IEEE, New York, New York.

Han et al., "Control Over WirelessHART Network," 2010, IEEE, New York, New York.

International Search Report and Written Opinion of the International Searching Authority in corresponding International Patent Application No. PCT/CN2012/071681 (Dec. 13, 2012).

Wang et al., "Design and Implementation for the Industrial Wireless Gateway of Smart Tunneling," 2010 International Conference on Measuring Technology and Mechatronics Automation, IEEE Computer Society (Mar. 2010).

* cited by examiner

ELECTRICAL GATEWAY AND COMMUNICATION METHOD OF ELECTRICAL GATEWAY

CROSS-REFERENCE TO RELATED APPLICATIONS

This application is a continuation of International Patent Application No. PCT/CN2012/071681, filed on Feb. 27, 2012, which is hereby incorporated by reference in its entirety.

FIELD OF THE INVENTION

The present invention relates to the field of communications technologies, and in particular, to an electrical gateway and a communication method of the electrical gateway.

BACKGROUND OF THE INVENTION

With an electric power communication system, it is very convenient for an electricity supplier to manage and control a home electric meter, at the same time, the electricity supplier may obtain the current operating situation of the electric meter in time, and therefore, the electricity supplier does not need to go a user's home for obtaining electric meter information.

The conventional electric power communication system includes an electric meter and a primary station, a communication module in the electric meter may report operation parameters of the electric meter to the primary station, and the primary station may deliver a command to control and manage the electric meter.

SUMMARY OF THE INVENTION

Embodiments of the present invention provide an electrical gateway and a communication method of the electrical gateway, so as to control data transmission between a terminal device and an uplink network element.

An embodiment of the present invention provides a communication method of an electrical gateway, which includes:

receiving downlink data sent by an uplink network element; and when determining that the downlink data is obtaining terminal device information, transmitting terminal device information to the uplink network element if the terminal device information is stored in the electrical gateway; transmitting the obtaining the terminal device information to a terminal device if the terminal device information is not stored in the electrical gateway.

An embodiment of the present invention provides an electrical gateway, which includes an uplink communication module, a downlink communication module and a control unit;

the uplink communication module is configured to communicate with an uplink network element;

the downlink communication module is configured to communicate with a terminal device; and the control unit, connecting the uplink communication module and the downlink communication module, is configured to, when it is determined that downlink data sent by the uplink network element is obtaining terminal device information, transmit the terminal device information to the uplink communication module if the terminal device information is stored in the electrical gateway, and transmit the obtaining the terminal device information to the downlink communication module if the terminal device information is not stored in the electrical gateway.

It can be seen that in an electrical gateway, after processing the downlink data sent by the uplink network element to the terminal device, the control unit may return a processing result, for example, the terminal device information, to the uplink network element, so as to reduce data traffic transmitted to the terminal device, so that the electrical gateway can control the downlink data through the control unit, thereby controlling data transmission between the terminal device and the uplink network element.

An embodiment of the present invention provides an electrical gateway, which includes an uplink communication module and a downlink communication module, where the uplink communication module is connected to the downlink communication module;

the downlink communication module is configured to communicate with a terminal device; and the uplink communication module is configured to, when it is determined that downlink data sent by the uplink network element is obtaining terminal device information, send terminal device information if the terminal device information is stored in the electrical gateway, and transmit the obtaining the terminal device information to the downlink communication module if the terminal device information is not stored in the electrical gateway.

An embodiment of the present invention provides an electrical gateway, which includes a wireless communication module and a Zigbee communication module, where the wireless communication module is connected to the Zigbee communication module;

the Zigbee communication module is configured to communicate with a terminal device; and the wireless communication module is configured to receive downlink data sent by an uplink network element, decapsulate the downlink data, and determine whether it is the obtaining terminal device information according to the decapsulated downlink data, and when the decapsulated downlink data is the obtaining the terminal device information, encapsulate the terminal device information and send the encapsulated terminal device information if the terminal device information is stored in the electrical gateway, and encapsulate the obtaining the terminal device information and transmit it to the Zigbee communication module if the terminal device information is not stored in the electrical gateway.

It can be seen that in another electrical gateway, the uplink communication module may communicate with the downlink communication module directly, the processing function performed according to the specific content of the downlink data may be integrated into the uplink communication module, so as to fully utilize resources of the uplink communication module, and save the volume of the electrical gateway. In addition, the running of the control unit is reduced, thereby reducing the power consumption of the electrical gateway.

An embodiment of the present invention provides an electrical gateway, which includes an uplink communication module and a downlink communication module, where the uplink communication module is connected to the downlink communication module;

the uplink communication module is configured to communicate with an uplink network element; and the downlink communication module is configured to, when it is determined that downlink data sent by the uplink network element is obtaining terminal device information, transmit the terminal device information to the uplink communication module if the terminal device information is stored in the electrical gateway, and send the obtaining the terminal device information if the terminal device information is not stored in the electrical gateway.

It can be seen that in another electrical gateway, and in the electrical gateway of the embodiment of the present invention, the uplink communication module may communicate with the downlink communication module directly, the processing function performed according to the specific content of the downlink data is integrated into the downlink communication module, so as to fully utilize resources of the downlink communication module, and save the volume of the electrical gateway. In addition, the running of the redundant control unit is reduced, thereby reducing the power consumption of the electrical gateway.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
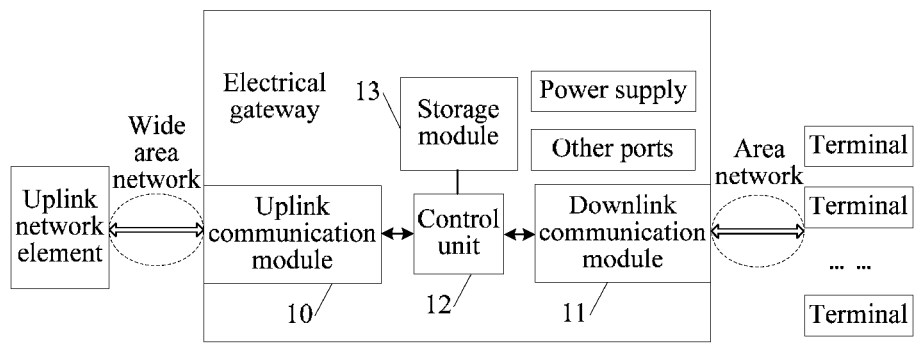
FIG. 1 is a schematic structural diagram of an electrical gateway provided in an embodiment of the present invention.

An embodiment of the present invention provides an electrical gateway, through which at least one terminal device (such as an electric meter or a gas meter) may access an uplink network, and the electrical gateway may control data transmission between the terminal device and an uplink network element. The schematic structural diagram of the electrical gateway is shown in FIG. 1, and the electrical gateway includes: an uplink communication module 10, a downlink communication module 11, and a control unit 12; in addition, the electrical gateway may further include a power supply, other interfaces, and the like.

The uplink communication module 10 is mainly connected to a network element in an uplink wide area network (Wide Area Network, WAN), for example, a device such as a primary station or a server, and is configured to communicate with the uplink network element.

The control unit 12 connects the uplink communication module 10 and the downlink communication module 11 (for example, the control unit 12 may communicate with the uplink communication module 10 and the downlink communication module 11), and is configured to, when the control unit 12 determines that downlink data sent by the uplink network element is obtaining terminal device information, transmit the terminal device information to the uplink communication module 10 if the terminal device information is stored in the electrical gateway, and transmit the obtaining the terminal device information to the downlink communication module 11 if the terminal device information is not stored in the electrical gateway.

The obtaining the terminal device information may be information of reading the state information, the networking information or the current state and the like of the terminal device, for example, information of reading a reading of an electric meter (that is, the number shown on the electric meter) or the quantity of electricity.

The downlink communication module 11 is connected to a terminal device of a downlink home area network (Home area network, HAN), and is configured to communicate with the terminal device.

It should be understood that after the uplink communication module 10 receives downlink data, the electrical gateway needs to decapsulate the downlink data first, and determines whether the decapsulated downlink data is the terminal device information, where the decapsulating the downlink data by the electrical gateway may be executed by the uplink communication module 10 or the control unit 12. In specific embodiments:

(1) When the decapsulating the downlink data is executed by the uplink communication module 10, the uplink communication module 10 is configured to receive the downlink data sent by the uplink network element, and decapsulate the downlink data and transmit it to the control unit 12, and the control unit 12 is specifically configured to determine whether it is the obtaining the terminal device information according to the decapsulated downlink data.

(2) When the decapsulating the downlink data is executed by the control unit 12, the uplink communication module 10 is configured to receive the downlink data sent by the uplink network element, and transmit the downlink data to the control unit 12, and the control unit 12 is configured to decapsulate the downlink data, and determine whether it is the obtaining the terminal device information according to the decapsulated downlink data.

Further, when the control unit 12 in the electrical gateway determines that the downlink data is the obtaining the terminal device information, if the terminal device information is stored in the electrical gateway, the electrical gateway needs to send the terminal device information to the uplink network element, without the need of obtaining it from the terminal device. Specifically, it needs to encapsulate the terminal device information by using a communication protocol between the uplink communication module 10 and the uplink network element, and then send the encapsulated terminal device information to the uplink network element. However, the encapsulating the terminal device information by the electrical gateway may be executed by the uplink communication module 10 or the control unit 12. In specific embodiments:

(1) When the encapsulating operation is executed by the uplink communication module 10, the control unit 12 is configured to, when the terminal device information is stored in the electrical gateway, transmit the terminal device information to the uplink communication module 10, and the uplink communication module 10 encapsulates the terminal device information, and sends the encapsulated terminal device information to the uplink network element.

(2) When the encapsulating operation is executed by the control module 12, the control unit 12 is configured to, when the terminal device information is stored in the electrical gateway, encapsulate the terminal device information and transmit the encapsulated terminal device information to the uplink communication module 10, and the uplink communication module 10 sends the encapsulated terminal device information to the uplink network element.

Furthermore, when the control unit 12 in the electrical gateway determines that the downlink data is obtaining the terminal device information, if the terminal device information is not stored in the electrical gateway, the electrical gateway needs to send the obtaining the terminal device information to the terminal device, so that the terminal device obtains the terminal device information. Specifically, it needs to encapsulate the obtaining the terminal device information by using a communication protocol between the downlink communication module 11 and the terminal device, and then send the encapsulated obtaining the terminal device information to the terminal device. The encapsulating the obtaining the terminal device information by the electrical gateway may be executed by the downlink communication module 11 or the control unit 12. In specific embodiments:

(1) When the encapsulating operation is executed by the downlink communication module 11, the control unit 12 is configured to, when the terminal device information is not stored in the electrical gateway, transmit the obtaining the terminal device information to the downlink communication module 11, and the downlink communication module 11 encapsulates the obtaining the terminal device information, and sends the encapsulated obtaining the terminal device information to the terminal device.

(2) If the processing capability of the downlink communication module 11 is limited, the encapsulating operation may be executed by the control module 12, and the control unit 12 is configured to, when the terminal device information is not stored in the electrical gateway, encapsulate the obtaining the terminal device information and transmit the encapsulated obtaining the terminal device information to the downlink communication module 11, and the downlink communication module 11 sends the encapsulated obtaining the terminal device information to the terminal device.

It can be seen that in the electrical gateway of the embodiment of the present invention, the control unit 12, which connects the downlink communication module 11 and the uplink communication module 10, may perform processing according to the specific content of the downlink data sent by the uplink network element to the terminal device, and then return a processing result, for example, the terminal device information, to the uplink network element, so as to reduce data traffic transmitted to the terminal device, so that the electrical gateway can control the downlink data through the control unit 12, thereby controlling data transmission between the terminal device and the uplink network element.

Further, in the electrical gateway, when the control unit 12 determines that the downlink data is control information for the terminal device, the control unit 12 transmits the control information to the downlink communication module 11, so that the downlink communication module 11 sends it to the terminal device; and when the control unit 12 determines that the downlink data is configuration information for the electrical gateway, the control unit 12 configures the electrical gateway according to the configuration information. The control information for the terminal device may indicate the control on the operation of the terminal device, for example, requiring the terminal device to send state information at a certain interval, or requiring the terminal device to send current state information, and the like; and the configuration information for the electrical gateway may refer to a parameter, such as transmission data of the electrical gateway, for example, traffic information of access of the electrical gateway, or the number of terminal devices, or traffic information of data uploaded by the electrical gateway, and the like, and in this way, traffic for access to an uplink network may be limited.

It should be noted that in this embodiment, when the electrical gateway sends the control information to the terminal device, the electrical gateway needs to encapsulate the control information by using the communication protocol between the downlink communication module 11 and the terminal device first, and then sends the encapsulated control information to the terminal device. Specifically, the encapsulating the control information may be executed by the control unit 12 or the downlink communication module 11.

In another specific embodiment, the downlink communication module 11 in the electrical gateway is further configured to receive uplink data sent by the terminal device, and when the control unit 12 determines that the uplink data is response information to the downlink data, the control unit 12 transmits the response information to the uplink communication module 10; and when the control unit 12 determines that the uplink data sent by the terminal device is state information or networking information reported by the terminal device, the control unit 12 controls a storage module to store the state information or the networking information.

The response information to the downlink data may be a response to a reading command or control information or the like sent by the uplink network element, such as, a response message indicating that the reading command is received; the state information reported by the terminal device may refer to the quantity of electricity, a reading state or the like of the terminal device; and the networking information may refer to a parameter of the terminal device in a network, such as information about whether it is in the network, the control unit 12 may control the storage module to store the state information or the networking information reported by the terminal device, and in this may, the state information or the networking information may be sent to the uplink network element as required, thereby reducing the data transmission between the terminal device and the uplink network element.

It should be noted that when the electrical gateway receives the uplink data of the terminal device and processes it, the electrical gateway needs to decapsulate the uplink data first, and specifically, the decapsulating the uplink data may be executed by the downlink communication module 11. However, if the processing capability of the downlink communication module 11 is limited, the decapsulating the uplink data may be executed by the control unit 12 or the uplink communication module 10. If the uplink data is the response information to the downlink data, before the response information is sent to the uplink network element, the uplink communication module 10 or the control unit 12 needs to encapsulate the response information by using the communication protocol between the uplink communication module 10 and the uplink network element.

It can be understood that a storage module 13, for example, a storage chip, may be further included in the electrical gateway and can be used to store data generated during the procedure of processing the downlink data or the uplink data by the control unit 12, such as, the configuration information for the electrical gateway, the networking information or the state information reported by the terminal device. In another specific embodiment, the storage module 13 may not be included in the electrical gateway, but externally connected to the electrical gateway, and in this may, the volume and the power consumption of the electrical gateway can be saved.

It should be noted that the control unit 12 may be a micro control unit (Micro Control Unit, MCU); the uplink communication module 10 may include, but not limit to, a general packet radio service technology (General Packet Radio Service, GPRS) communication module, a long term evolution (Long Term Evolution, LTE) communication module, a code division multiple access (Code Division Multiple Access, CDMA) communication module, an evolution data (Evolution Data Only, EVDO) communication module, a time division synchronization code division multiple access (TD-SCDMA) communication module, a wideband code division multiple access (Wideband Code Division Multiple Access, WCDMA) communication module, a global system of mobile communication (Global System of Mobile communication, GSM), or other wireless communication modules. Specifically, the uplink communication module may include a radio frequency unit, an MCU, and a storage unit, where the radio frequency unit is mainly configured to send uplink data and receive downlink data; the MCU is configured to control the radio frequency unit and the storage unit, such as control startup, and the MCU is further configured to perform operations, such as encapsulating the uplink data and decapsulating the downlink data; the downlink communication module 11 may be a short-distance communication module, such as, a wireless fidelity (Wireless Fidelity, Wi-Fi) communication module or a Zigbee communication module, where the Zigbee communication module may include a radio frequency unit, an MCU, and a storage unit, where the radio frequency unit is mainly configured to receive uplink data and send downlink data; and the MCU is configured to control the radio frequency unit and the storage unit, and may further configured to decapsulate the uplink data, encapsulate the downlink data, and perform other operations. Generally, the MCU included in the uplink communication module 10 has a stronger function than the MCU included in the downlink communication module 11, so that controlling the terminal device by the uplink network can be fully ensured.

In a specific application example: when receiving the downlink data sent by the uplink network element, the uplink communication module 10 of the electrical gateway decapsulates the downlink data and transmits it to the control unit 12; the control unit 12 determines, according to the content of the downlink data, that it needs to read a current reading parameter of an electric meter, then encapsulates the decapsulated downlink data and then transmits it to the downlink communication module 11; and the downlink communication module 11 sends the encapsulated downlink data to the electric meter.

When receiving the uplink data sent by the electric meter, the downlink communication module 11 of the electrical gateway transmits the uplink data to the control unit 12; and after decapsulating the uplink data, the control unit 12 determines, according to the content of the uplink data, that it is the networking information reported by the electric meter, such as the information of whether it is in the network, then controls the storage module 13 to store the networking information.

Figure 2:
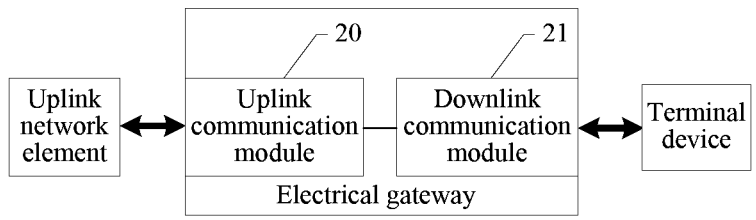
FIG. 2 is a schematic structural diagram of another electrical gateway provided in an embodiment of the present invention.

The embodiment of the present invention further provides another electrical gateway, through which at least one terminal device (such as, an electric meter and a gas meter) may access an uplink network, to control data transmission between the terminal device and the uplink network element, and in the electrical gateway of this embodiment, the processing performed according to the specific content of data (for example, determining whether downlink data is the configuration for the electrical gateway or the control for the terminal device, and the like) is integrated into an uplink communication module 20, or integrated into an uplink communication module 20 and a downlink communication module 21. A schematic structural diagram is shown in FIG. 2, and the electrical gateway includes:

An uplink communication module 20 is connected to a downlink communication module 21 communicating with a terminal device (for example, the uplink communication module 20 may communicate with the downlink communication module 21), and is configured to receive downlink data sent by an uplink network element, and when it is determined that the downlink data sent by the uplink network element is obtaining the terminal device information, send the terminal device information if the terminal device information is stored in the electrical gateway, and transmit the obtaining the terminal device information to the downlink communication module 21 if the terminal device information is not stored in the electrical gateway.

The uplink communication module 20 may decapsulate the downlink data first, then determines whether it is the obtaining the terminal device information according to the decapsulated downlink data, and when sending the terminal device information, the uplink communication module 20 needs to encapsulate the terminal device information first, then sends the encapsulated terminal device information to the uplink network element.

It should be understood that if the terminal device information is not stored in the electrical gateway, it needs to send the downlink data, that is, the obtaining the terminal device information is sent to the terminal device, so that the electrical gateway obtains the terminal device information from the terminal device. That is, the obtaining the terminal device information is first encapsulated and then is sent. Specifically, the encapsulating operation herein may be executed by the uplink communication module 20 or the downlink communication module 21, then in the specific embodiments:

(1) If the encapsulating operation is executed by the downlink communication module 21, the uplink communication module 20 is configured to transmit the obtaining the terminal device information to the downlink communication module 21 if the terminal device information is not stored in the electrical gateway, and the downlink communication module 21 encapsulates the obtaining the terminal device information and sends it to the terminal device.

(2) If the encapsulating operation is executed by the uplink communication module 20, the uplink communication module 20 is configured to, if the terminal device information is not stored in the electrical gateway, encapsulate the obtaining the terminal device information and then transmit it to the downlink communication module 21, and the information is sent to the terminal device through the downlink communication module 21.

It should be noted that the encapsulating in the embodiment may be executed by the uplink communication module 20, or may be executed by the downlink communication module 21, and the encapsulating operation is preferably executed by the uplink communication module 20. In addition, if the capability of the downlink communication module 21 is limited, the encapsulating operation may be executed by the uplink communication module 20.

In one specific embodiment, when the uplink communication module 20 determines that the downlink data is control information for the terminal device, the uplink communication module 20 transmits the control information to the downlink communication module 21, then the downlink communication module sends the control information to the terminal device; and when the uplink communication module 20 determines that the downlink data is configuration information for the electrical gateway, the uplink communication module 20 configures the electrical gateway according to the configuration information.

Further, the downlink communication module 21 in the electrical gateway is further configured to receive the uplink data sent by the terminal device, and when the uplink communication module 20 determines that the uplink data is response information to the downlink data, the uplink communication module 20 sends the response information, that is, encapsulates the response information and sends it to the uplink network element; when the uplink communication module 20 determines that the uplink data is state information or networking information reported by the terminal device, the uplink communication module 20 stores the state information or the networking information. The encapsulating the response information by the uplink communication module 20 is performed according to a communication protocol between the uplink communication module 20 and the uplink network element; in addition, when the electrical gateway receives the uplink data, the electrical gateway needs to decapsulate the uplink data first, and the specific decapsulating operation may be executed by the downlink communication module 21 or the uplink communication module 20.

In the specific implementation, the function of processing according to the specific content of the uplink data and the downlink data may be integrated into a control module, such as an MCU, included in the uplink communication module 20. In this way, the MCU included in the uplink communication module 20 not only can decapsulate the downlink data and encapsulate the uplink data, but also can perform processing according to the specific content in the downlink data and the uplink data, for example, determining according to the downlink data whether the downlink data is the configuration for the electrical gateway or the obtaining the terminal device information, and the like, thereby fully utilizing the resource space of the uplink communication module 20.

When the uplink communication module 20 stores the networking information or state information, the information can be directly stored in a storage unit included in the uplink communication module 20 without an additional external data storage unit. Moreover, the networking information or state information reported by the terminal device, the obtaining the terminal device information, the configuration information for the electrical gateway, the response information to the downlink data and the control information for the terminal device in the embodiment of the present invention are described in the embodiment corresponding to FIG. 1, and details are not repeated herein.

Specifically, the uplink communication module 20 may be a wireless communication module (including but not limited to a GPRS communication module, an LTE communication module, a CDMA communication module, an EVDO communication module, a TD-SCDMA communication module, a WCDMA communication module, or a GSM communication module), and the downlink communication module 21 may be a short-distance communication module, such as a Wi-Fi communication module and the Zigbee communication module.

In one specific application example, the terminal device may be an electric meter, the electrical gateway includes a wireless communication module and a Zigbee communication module, and the wireless communication module is connected to the Zigbee communication module. When the wireless communication module of the electrical gateway receives the downlink data sent by the uplink network element, after decapsulating the downlink data, the wireless communication module of the electrical gateway, the wireless communication module of the electrical gateway determines that the content of the downlink data is that a current reading parameter of the electric meter (for example, the number shown on the electric meter) needs to be read, then transmits the decapsulated downlink data to the Zigbee communication module; the Zigbee communication module encapsulates the decapsulated downlink data and sends it to the electric meter; and when the Zigbee communication module of the electrical gateway receives the uplink data sent by the electric meter, the Zigbee communication module transmits the uplink data to the wireless communication module, and the wireless communication module decapsulates the uplink data, determines, according to the content of the uplink data, that it is the networking information reported by the electric meter, such as the information of whether the meter is in the network, and stores the networking information.

In another specific application example: when the uplink communication module 20 of the electrical gateway receives the downlink data sent by the uplink network element, after decapsulating the downlink data, the uplink communication module 20 of the electrical gateway determines that the content of the downlink data is the configuration information for the electrical gateway, including the information of the number of terminals accessing the electrical gateway, then the uplink communication module 20 configures an MCU included in the downlink communication module 21, so that the MCU controls the downlink communication module 21 to receive the uplink data of the terminal device. Specifically, the MCU may be configured to control a radio frequency unit in the downlink communication module 21 to stop receiving uplink data sent by another terminal device when the number of terminal devices communicating with the downlink communication module 21 exceeds the number of terminals in the configuration information. In addition, the uplink communication module 20 may store the configuration information; and when the downlink communication module 21 of the electrical gateway receives the uplink data sent by the electric meter, the downlink communication module 21 of the electrical gateway transmits the uplink data to the uplink communication module 20, and after the uplink communication module 20 decapsulates the uplink data by the uplink communication module 20, the uplink communication module 20 determines that the content of the decapsulated uplink data is the response information to the uplink network element, encapsulates the response information by using a communication protocol between the uplink communication module 20 and the uplink network element and sends it to the uplink network element.

It can be seen that in the electrical gateway of the embodiment of the present invention, the uplink communication module 20 can communicate with the downlink communication module 21 directly without the processing performed by the control unit, and the function of processing according to the specific content of the downlink data and the uplink data is integrated into the uplink communication module 20, so as to fully utilize the resource of the uplink communication module and save the volume of a communication device, and the running of a redundant control unit is reduced, thereby reducing the power consumption of an electrical gateway.

In the electrical gateway of the embodiment, the function of processing according to the specific content of the downlink data and the uplink data is integrated into the uplink communication module 20, and in another specific embodiment, the integrating the function of processing according to the specific content of data into the uplink communication module 20 and the downlink communication module 21 may further have the following cases:

(1) Integrate a part of the function of processing into the uplink communication module 20, while integrate the other part of the function of processing into the downlink communication module 21.

One specific implementation includes: integrating the processing performed according to the specific content of the uplink data into the downlink communication module 21, and integrating the processing performed according to the specific content of the downlink data into the uplink communication module 21. In this embodiment, in addition to sending the obtaining the terminal device information, or the control information for the terminal device to the terminal device, the downlink communication module 21 is further configured to receive the uplink data sent by the terminal device, after decapsulating the uplink data, and when determining that the decapsulated uplink data is the response information to the downlink data, transmit the response information to the uplink communication module 20; and when the downlink communication module 21 determines that the decapsulated uplink data is the state information or the networking information reported by the terminal device, the downlink communication module 21 stores the state information or the networking information. In addition to performing processing according to the specific content of the downlink data, the uplink communication module 20 is further configured to send the received response information to the uplink network element. When the electrical gateway sends the response information to the uplink network element, it needs to encapsulate the response information first and then send it, and the encapsulating operation may be executed by the uplink communication module 20 or the downlink communication module 21.

In this way, the uplink communication module 20 is in charge of processing according to the specific content of the downlink data, while the downlink communication module 21 is in charge of processing according to the specific content of the uplink data, and the specific processing performed by the two communication modules is different. Compared with the technical solution of integrating the function of processing according to the specific content of the downlink data and the uplink data into the uplink communication module 20, this may balance the resource utilizing rates of the uplink communication module 20 and the downlink communication module 21, and share the processing burden of the uplink communication module 20 properly.

(2) Integrate all function of processing into each of the uplink communication module 20 and the downlink communication module 21, in this case, processing may be performed according to the practical running situation of the uplink communication module 20 and downlink communication module 21, and specifically, in this embodiment:

The uplink communication module 20 is configured to, after receiving the downlink data, if the current resource occupying rate of the uplink communication module 20 is greater than a preset value, control the downlink communication module 21 to process the downlink data including the obtaining the terminal device information, the configuration information for the electrical gateway, and the control information for the terminal device.

Further, after the downlink communication module 21 receives the uplink data of the terminal device, if the current resource occupying rate of the downlink communication module 21 is greater than a preset value, control the uplink communication module 20 to process the uplink data including the networking information or the state information reported by the terminal device, and the response information to the downlink data.

When determining whether the current resource occupying rate is greater than the preset value, the uplink communication module 20 specifically determines the resource occupied when the control module included in the uplink communication module 20 runs, and similarly, the downlink communication module 21 needs to determine the resource occupied when the control module included in the downlink communication module 21 runs.

Figure 3:
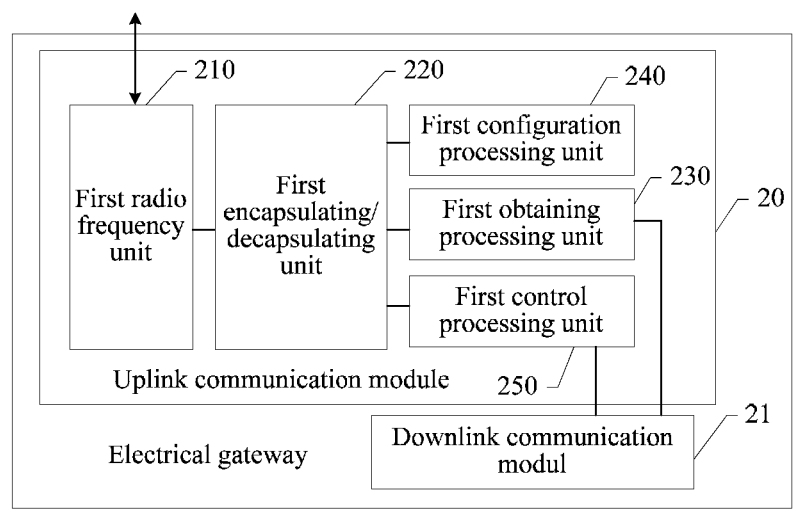
FIG. 3 is a specific schematic structural diagram of an uplink communication module in another electrical gateway provided in an embodiment of the present invention.

In one specific implementation procedure, the foregoing uplink communication module 20 may be implemented through the following structure, and the schematic structural diagram is shown in FIG. 3, which includes:

A first radio frequency unit 210 is configured to receive the downlink data sent by the uplink network element; and the first radio frequency unit 210 may be configured to send or receive data, where the first radio frequency unit 210 may include an antenna and an integrated chip (IC).

A first encapsulating/decapsulating unit 220 is configured to decapsulate the downlink data.

A first obtaining processing unit 230 is configured to, when it is determined that the decapsulated downlink data is the obtaining the terminal device information, control the first encapsulating/decapsulating unit 220 to encapsulate the terminal device information if the terminal device information is stored in the electrical gateway, and transmit the obtaining the terminal device information to the downlink communication module 21 if the terminal device information is not stored in the electrical gateway.

The first encapsulating/decapsulating unit 220 may encapsulate the obtaining the terminal device information and sends it to the downlink communication module 21.

The first radio frequency unit 210 is further configured to send the encapsulated terminal device information to the uplink network element.

The uplink communication module 20 may further include: a first configuration processing unit 240, configured to, when it is determined that the decapsulated downlink data is the configuration information for the electrical gateway, perform configuration on the electrical gateway according to the configuration information; and a first control processing unit 250, configured to, when it is determined that the decapsulated downlink data is the control information for the terminal device, transmit the control information to the downlink communication module 21.

In this way, units for processing according to the specific content of the downlink data may be integrated in the uplink communication module 20, that is, the first obtaining processing unit 230, the first configuration processing unit 240 and the first control processing unit 250, and the units may be integrated with the first encapsulating/decapsulating unit 220 onto one hardware, for example, integrated onto an MCU. In this case, the downlink communication module 21 may process the decapsulated uplink data according to the specific content of the uplink data, specifically including processing the networking information or the state information reported by the terminal device and the response information to the downlink data.

Figure 4:
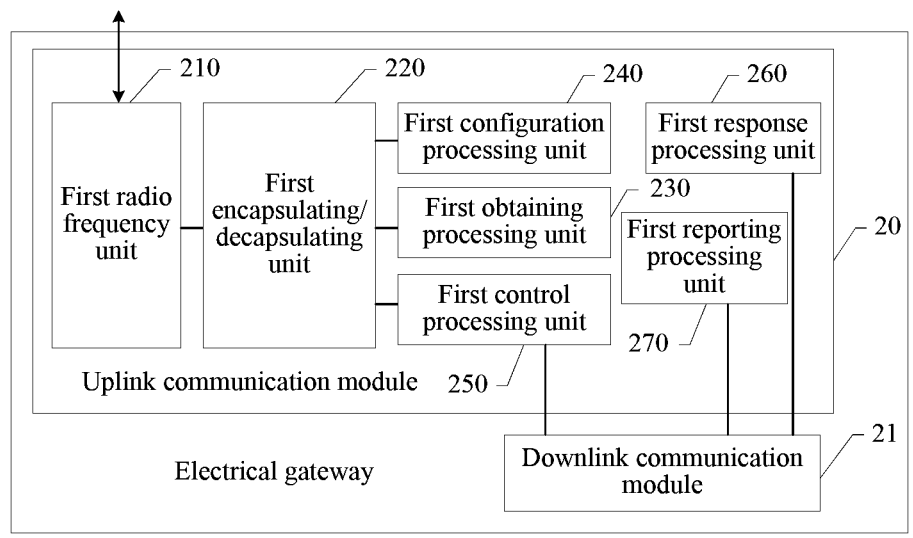
FIG. 4 is a specific schematic structural diagram of an uplink communication module in another electrical gateway provided in an embodiment of the present invention.

Further, as shown in FIG. 4, units for processing according to the specific content of the uplink data may be integrated into the uplink communication module 20, including a first response processing unit 260 and a first reporting processing unit 270, where the first response processing unit 260 is configured to, when it is determined that the decapsulated uplink data is the response information to the downlink data, control the first encapsulating/decapsulating unit 220 to encapsulate the response information, and the first radio frequency unit 210 sends the encapsulated response information to the uplink network element; and the first reporting processing unit 270 is configured to, when it is determined that the decapsulated uplink data is the state information or the networking information reported by the terminal device, control a storage unit to store the state information or the networking information.

It should be noted that the uplink communication module 20 may include other units, such as, an inner flash, a storage unit and a resource determining unit, and the storage unit may store the foregoing networking information or the state information reported by the terminal device, and the configuration information for the electrical gateway; and after the first radio frequency unit 210 receives the downlink data, the resource determining unit determines the resource occupying rate of the uplink communication module 20, if the resource occupying rate is greater than a preset value, the first encapsulating/decapsulating unit 220 decapsulates the downlink data and transmits it to the downlink communication module 21, so that processing is performed according to the specific content of the decapsulated downlink data, and if the resource occupying rate is smaller than or equal to the preset value, processing is performed by the uplink communication module 20.

Figure 5:
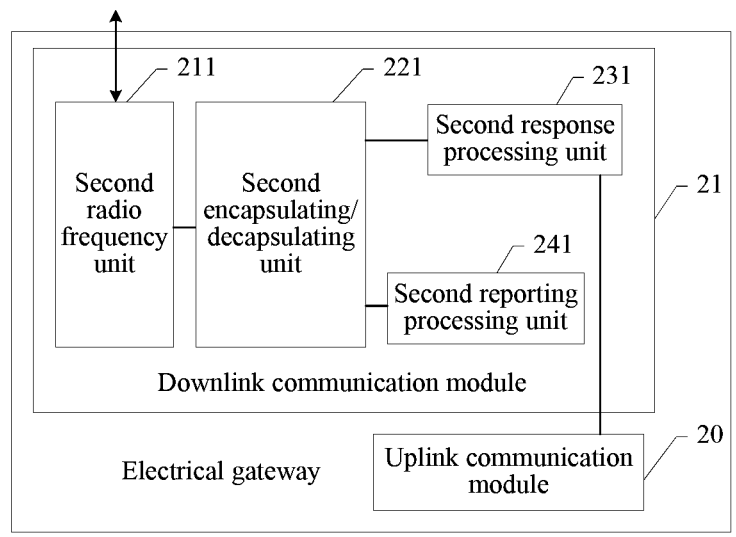
FIG. 5 is a specific schematic structural diagram of a downlink communication module in another electrical gateway provided in an embodiment of the present invention.

In another specific embodiment, the foregoing downlink communication module 21 may be implemented by the following structure, and the schematic structural diagram is shown in FIG. 5, which includes:

A second radio frequency unit 211 is configured to receive the uplink data sent by the terminal device, and the second radio frequency unit 211 is configured to send or receive data, where the second radio frequency unit 211 may include an antenna and an integrated chip (IC).

A second encapsulating/decapsulating unit 221 is configured to decapsulate the uplink data.

A second response processing unit 231 is configured to, when it is determined that the decapsulated uplink data is the response information to the downlink data, transmit the response information to the uplink communication module 20.

A second reporting processing unit 241 is configured to, when it is determined that the decapsulated uplink data is the state information or the networking information reported by the terminal device, control a storage unit to store the state information or the networking information.

In this way, units for processing according to the specific content of the downlink data, that is, the second response processing unit 231 and the second reporting processing unit 241, may be integrated into the downlink communication module 21, and the units for processing may be integrated with the second encapsulating/decapsulating unit 221 onto one hardware, for example, integrated onto an MCU; in this case, the processing may be performed by the uplink communication module 20 as shown in FIG. 3 according to the specific content of the decapsulated downlink data. In another case, another unit for processing may be integrated into the downlink communication module 21, such as a unit for processing according to the specific content of the uplink data.

It should be noted that the downlink communication module 21 may further include other units, such as an inner flash and a storage unit, and the storage unit may be configured to store the networking information or the state information reported by the terminal device, and the like.

An embodiment of the present invention further provides another electrical gateway, through which at least one terminal device (for example, an electric meter or a gas meter) may access an uplink network, so as to control data transmission between the terminal device and the uplink network element, and in the electrical gateway of this embodiment, the function of processing according to the specific content of data may be integrated into a downlink communication module 21, or integrated into an uplink communication module 20 and a downlink communication module 21, where the schematic structural diagram, as shown in FIG. 2, may include:

An uplink communication module 20 is connected to a downlink communication module 21 (for example, the uplink communication module 20 communicates with the downlink communication module 21), and is configured to communicate with an uplink network element.

The downlink communication module 21 is configured to, when it is determined that downlink data is obtaining terminal device information, transmit the terminal device information to the uplink communication module 20 if the terminal device information is stored in the electrical gateway, and send the obtaining the terminal device information, that is, send it to the terminal device if the terminal device information is not stored in the electrical gateway.

Specifically, the uplink communication module 20 may receive the downlink data sent by the uplink network element and transmit the downlink data to the downlink communication module 21, while the downlink communication module 21 needs to decapsulate the downlink data first, then determines whether the decapsulated downlink data is the obtaining the terminal device information; or the uplink communication module 20 decapsulates the downlink data and sends it to the downlink communication module 21 for processing. While transmitting the terminal device information to the uplink communication module 20, the downlink communication module 21 may first perform encapsulation by using a communication protocol between the uplink communication module 20 and the uplink network element, and then transmit it to the uplink communication module 20.

In one specific embodiment, when the downlink communication module 21 determines that the downlink data is control information for the terminal device, the downlink communication module 21 encapsulates the control information and sends it to the terminal device; and when the downlink communication module 21 determines that the downlink data is configuration information for the electrical gateway, the downlink communication module 21 configures the electrical gateway according to the configuration information.

Further, the downlink communication module 21 is further configured to receive the uplink data sent by the terminal device, decapsulate the uplink data, and then perform processing according to the specific content of the decapsulated uplink data, which specifically includes: when it is determined that the decapsulated uplink data is response information to the downlink data, transmitting the response information to the uplink communication module 20, and when the downlink communication module 21 determines that the decapsulated uplink data is the state information or the networking information reported by the terminal device, storing the state information or the networking information.

It should be noted that in the specific implementation, the uplink communication module 20 may be a wireless communication module, such as a GPRS, the downlink communication module 21 may be a short-distance communication module, such as a Wi-Fi communication module or a Zigbee communication module. In addition, the downlink communication module 21 may store data generated during the procedure of processing according to the specific content of the decapsulated uplink data and downlink data to the storage unit included in the downlink communication module 21 directly without an additional external data storage unit.

In a specific application example, when the uplink communication module 20 of the electrical gateway receives the downlink data sent by the uplink network element, the uplink communication module 20 of the electrical gateway decapsulates the downlink data and transmits it to the downlink communication module 21; and the downlink communication module 21 determines that that the content of the downlink data is control information of the electric meter, which includes information, such as a cycle of reporting the state information by the electric meter, and then the downlink communication module 21 may encapsulate the control information by using a communication protocol between the downlink communication module 21 and the electric meter and send it to the electric meter.

When the downlink communication module 21 of the electrical gateway receives the uplink data sent by the electric meter, after decapsulating the uplink data, the downlink communication module 21 of the electrical gateway determines that the content of the uplink data is the reported state information, such as information of the current quantity of electricity, then transmits the state information to the uplink communication module 20; and the uplink communication module 20 encapsulates the state information by using the communication protocol between the uplink communication module 20 and the uplink network element and sends it to the uplink network element.

It can be seen that in the electrical gateway according to the embodiment of the present invention, the uplink communication module 20 can communicate with the downlink communication module 21 directly, and the function of processing according to the specific content of the downlink data and the uplink data is integrated in the downlink communication module 21, so as to fully utilize the resource of the downlink communication module 21 and saves the volume of a communication device, and the running of a redundant control unit is reduced, thereby reducing the power consumption of the electrical gateway.

In the electrical gateway of the embodiment, the function of processing according to the specific content of the downlink data and the uplink data may be integrated into the uplink communication module 20, and in another specific embodiment, the processing according to the specific content of the downlink data may be integrated into the downlink communication module 21, while the processing according to the specific content of the uplink data may be integrated into the uplink communication module 20. In this embodiment, in addition to processing the downlink data, the downlink communication module 21 is further configured to receive the uplink data sent by the terminal device, and transmit the uplink data to the uplink communication module 20; while in addition to processing the foregoing obtaining the terminal device information, the configuration information for the electrical gateway and the control information for the terminal device, the uplink communication module 20 may further perform processing according to the specific content of the uplink data, which specifically includes: when it is determined that the uplink data is response information to the downlink data, sending the response information, that is, encapsulating the response information and sending it to the uplink network element; and when the uplink communication module 20 determines that the uplink data is the state information or the networking information reported by the terminal device, storing the state information or the networking information.

In this way, the uplink communication module 20 may be in charge of processing according to the specific content of the uplink data, while the downlink communication module 21 may be in charge of processing according to the specific content of the downlink data, and the specific processing of the two communication modules may be different. Compared with the technical solution of integrating the function of processing according to the specific content of the downlink data and the uplink data into the downlink communication module 21, this may balance the resource utilizing rates of the uplink communication module 20 and the downlink communication module 21, and share the processing burden of the downlink communication module 21 properly.

Figure 6:
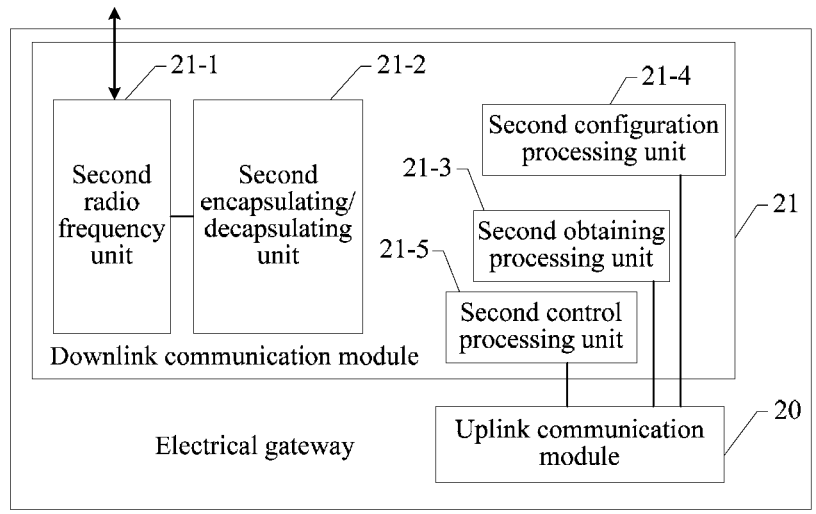
FIG. 6 is a specific schematic structural diagram of a downlink communication module in another electrical gateway provided in an embodiment of the present invention.

In a specific implementation procedure, the downlink communication module 21 in the embodiment may be implemented through the following structure, and the schematic structural diagram is shown in FIG. 6, which includes:

A second obtaining processing unit 21-3 is configured to, when it is determined that the decapsulated downlink data is obtaining the terminal device information, if the terminal device information is stored in the electrical gateway, transmit the terminal device information to the uplink communication module 20, and the uplink communication module 20 sends it; and if the terminal device information is not stored in the electrical gateway, control a second encapsulating/decapsulating unit 21-2 to encapsulate the obtaining the terminal device information.

The second encapsulating/decapsulating unit 21-2 is configured to encapsulate the received obtaining the terminal device information.

A second radio frequency unit 21-1 is configured to send the encapsulated obtaining the terminal device information to the terminal device; and the second radio frequency unit 21-1 is configured to send or receive the structure of data, and may include an antenna and an integrated chip (IC).

The downlink communication module 21 may further include: a second configuration processing unit 21-4, configured to, when it is determined that the decapsulated downlink data is the configuration information for the electrical gateway, perform configuration on the electrical gateway according to the configuration information; and a second control processing unit 21-5, configured to, when it is determined that the decapsulated downlink data is the control information for the terminal device, control the second encapsulating/decapsulating unit 21-2 to encapsulate the control information, then the second radio frequency unit 21-1 is further configured to send the encapsulated control information to the terminal device.

In this way, units for processing according to the specific content of the decapsulated downlink data, that is, the second obtaining processing unit 21-3, the second configuration processing unit 21-4 and the second control processing unit 21-5, may be integrated in the downlink communication module 21, and the units may be integrated with the second encapsulating/decapsulating unit 21-2 onto one hardware, for example, integrated onto an MCU. In this case, the uplink communication module 20 may perform processing according to the specific content of the decapsulated uplink data, specifically including processing on the networking information or the state information reported by the terminal device and on the response information to the downlink data.

Figure 7:
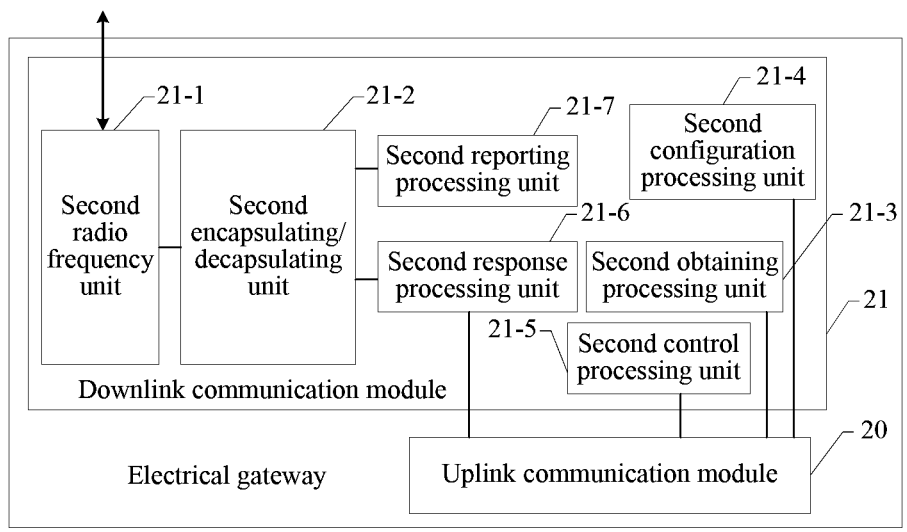
FIG. 7 is a specific schematic structural diagram of a downlink communication module in another electrical gateway provided in an embodiment of the present invention.

Further, referring to FIG. 7, units for processing according to the specific content of the uplink data may be integrated into the downlink communication module 21, including a second response processing unit 21-6 and a second reporting processing unit 21-7, where the second response processing unit 21-6 is configured to, when it is determined that the decapsulated uplink data is the response information to the downlink data, transmit the response information to the uplink communication module 20, and the uplink communication module 20 sends it; and the second reporting processing unit 21-7 is configured to, when it is determined that the decapsulated uplink data is the state information or the networking information reported by the terminal device, control a storage unit to store the state information or the networking information.

It should be noted that downlink communication module 21 may include other units, such as, an inner flash, a storage unit and a resource determining unit, and the storage unit may store the networking information or the state information reported by the terminal device, and the configuration information for the electrical gateway; and after the second radio frequency unit 21-1 receives the uplink data, the resource determining unit may determine the resource occupying rate of the downlink communication module 21, if the resource occupying rate is greater than a preset value, the second encapsulating/decapsulating unit 21-2 decapsulates the uplink data and transmits it to the uplink communication module 20, so that processing is performed according to the specific content of the decapsulated uplink data, and if the resource occupying rate is smaller than or equal to the preset value, the processing is performed by the downlink communication module 21.

Figure 8:
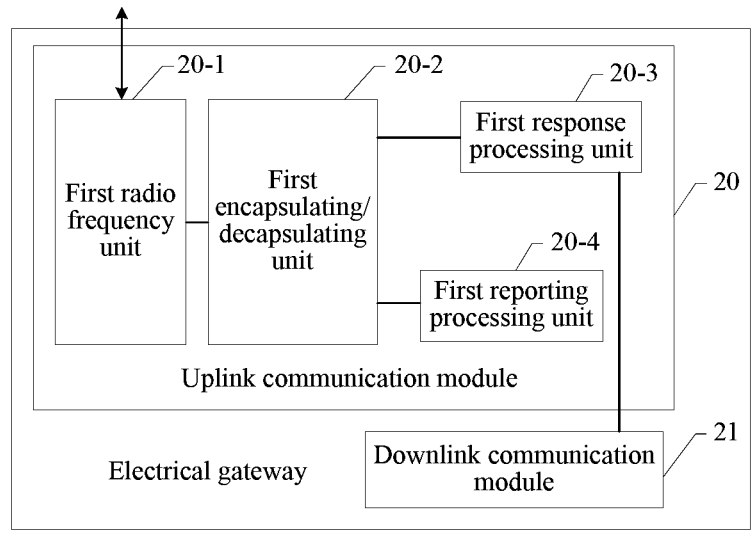
FIG. 8 is a specific schematic structural diagram of an uplink communication module in another electrical gateway provided in an embodiment of the present invention.

In another specific implementation, the uplink communication module 20 may be implemented by the following structure, and the schematic structural diagram is shown in FIG. 8, which includes:

A first response processing unit 20-3 is configured to, when it is determined that the decapsulated uplink data is the response information to the downlink data, control the first encapsulating/decapsulating unit 20-2 to encapsulate the response information.

A first reporting processing unit 20-4 is configured to, when it is determined that the decapsulated uplink data is the state information or the networking information reported by the terminal device, control a storage unit to store the state information or the networking information.

A first encapsulating/decapsulating unit 20-2 is configured to encapsulate the response information.

A first radio frequency unit 20-1 is configured to send the encapsulated response information to the uplink network element; and the first radio frequency unit 20-1 is configured to send or receive the structure of data and may include an antenna and an integrated chip (IC).

In this way, units for processing according to the specific content of the decapsulated uplink data, that is, the first response processing unit 20-3 and the first reporting processing unit 20-4, may be integrated into the uplink communication module 20, and the units may be integrated with the first encapsulating/decapsulating unit 20-2 onto one hardware, for example, integrated onto an MCU; in this case, processing may be performed by the downlink communication module 21 shown in FIG. 6 according to the specific content of the decapsulated downlink data. In another case, another unit for processing may also be integrated into the uplink communication module 20, such as a unit for processing according to the specific content of the downlink data.

It should be noted that the uplink communication module 20 may further include other units, such as an inner flash and a storage unit, and the storage unit may be configured to store the networking information or the state information reported by the terminal device, and the like.

Figure 9:
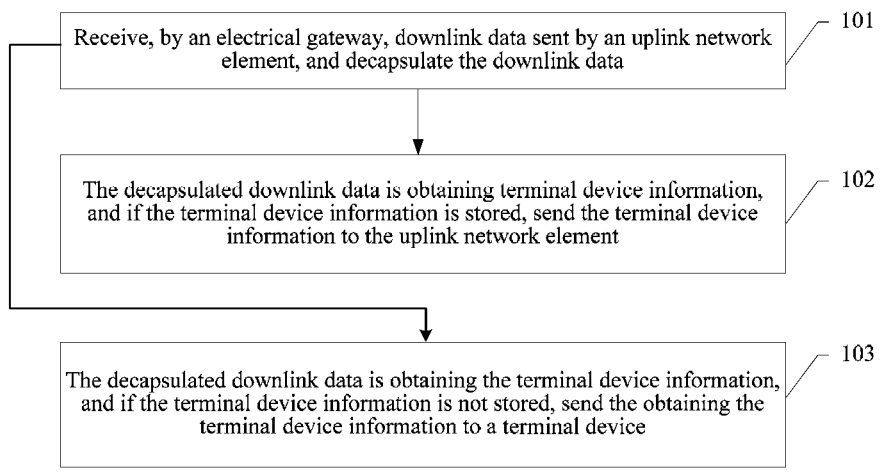
FIG. 9 is a flow chart of a communication method of an electrical gateway provided in an embodiment of the present invention.

An embodiment of the present invention further provides a communication method of an electrical gateway, which mainly is the method executed by the electrical gateway shown in any one of FIG. 1 to FIG. 8, and the flow chart is shown in FIG. 9, which includes:

Step 101: Receive, by an electrical gateway, downlink data sent by an uplink network element. When it is determined that the downlink data is obtaining terminal device information, the electrical gateway may execute step 102 or step 103.

It can be understood that the electrical gateway needs to decapsulate the downlink data first, then determines whether the decapsulated downlink data is the obtaining the terminal device information.

Step 102: If the terminal device information is stored in the electrical gateway, send the terminal device information to the uplink network element, and specifically, encapsulate the terminal device information by using a communication protocol between the electrical gateway and the uplink network element, and send it to the uplink network element.

Step 103: If the terminal device information is not stored in the electrical gateway, send the obtaining the terminal device information to a terminal device, and specifically, encapsulate the obtaining the terminal device information by using a communication protocol between the electrical gateway and the terminal device, and sending it to the terminal device.

Further, in addition to executing step 101 to step 103, the electrical gateway may perform the following processing on the decapsulated downlink data, including: when it is determined that the decapsulated downlink data is control information for the terminal device, encapsulating the control information and sending it to the terminal device; and when it is determined that the decapsulated downlink data is configuration information for the electrical gateway, configuring the electrical gateway according to the configuration information. In addition, the electrical gateway may further receive uplink data sent by the terminal device, decapsulate the uplink data, and process the decapsulated uplink data according to the specific content of the uplink data, which specifically includes: when it is determined that the decapsulated uplink data is response information to the downlink data, encapsulating the response information and sending it to the uplink network element; and when it is determined that the decapsulated uplink data is state information or networking information reported by the terminal device, storing the state information or the networking information.

It should be noted that for the specific structure of the electrical gateway in the method embodiment, reference may be made to FIG. 1 to FIG. 8 and the foregoing description of FIG. 1 to FIG. 8, and details are not described for the electrical gateway in the method embodiment.

It can be seen that in the embodiment of the present invention, after directly processing the downlink data sent by the uplink network element to the terminal device, the electrical gateway may return a processing result, for example, the terminal device information, to the uplink network element, so as to reduce data traffic transmitted to the terminal device, so that the electrical gateway can control the downlink data through a control unit, thereby controlling data transmission between the terminal device and the uplink network element.

In addition, after directly processing the uplink data sent by the terminal device, the electrical gateway may store a processing result, for example, store the networking information or the state information reported by the terminal device, without the need of sending the information to the uplink network element, so as to reduce data traffic transmitted to an uplink network, so that the electrical gateway can control the uplink data, thereby controlling data transmission between the terminal device and the uplink network element.

Persons of ordinary skill in the art understand that all or part of the steps of each method in the above embodiments may be implemented by a program instructing relevant hardware. The program may be stored in a computer readable storage medium. The storage medium may include ROM, RAM, a magnetic disk, or an optical disk.

The above describes in detail the electrical gateway and the communication method of the electrical gateway provided by the embodiments of the present invention, specific examples are applied herein to explain the principle and implementation of the present invention, and the foregoing illustration of the embodiments merely helps to understand the method and the core idea of the present invention; meanwhile, for persons of ordinary skill in the art, variations can be made in terms of the specific implementation and the application scope according to the idea of the present invention, and to sum up, the content of the present specification shall not be understood as a limitation to the present invention.

What is claimed is:

1. An electrical gateway, comprising:
an uplink communication module,
a downlink communication module, and
a control unit; wherein
the uplink communication module is configured to communicate with an uplink network element;
the downlink communication module is configured to communicate with a terminal device; and
the control unit, connecting the uplink communication module and the downlink communication module, is configured to: determine that downlink data sent by the uplink network element is obtaining terminal device information, transmit the terminal device information to the uplink communication module if the terminal device information is stored in the electrical gateway, and transmit the terminal device information to the downlink communication module if the terminal device information is not stored in the electrical gateway.

2. The electrical gateway according to claim 1, wherein the terminal device information is stored in the electrical gateway and the control unit is configured to transmit the terminal device information to the uplink communication module, and wherein:
the control unit is further configured to encapsulate the terminal device information and transmit the terminal device information to the uplink communication module; or
the control unit is configured to transmit the terminal device information to the uplink communication module, wherein the terminal device information is encapsulated by the uplink communication module.

3. The electrical gateway according to claim 1, wherein the terminal device information is not stored in the electrical gateway and the control unit is configured to transmit the obtaining the terminal device information to the downlink communication module, and wherein:
the control unit is further configured to encapsulate the terminal device information and transmit the terminal device information to the downlink communication module; or
the control unit is configured to transmit the obtaining the terminal device information to the downlink communication module, wherein the terminal device information is encapsulated by the downlink communication module.

4. The electrical gateway according to claim 1, wherein the terminal device is an electric meter, and the terminal device information is a reading of the electric meter.

5. The electrical gateway according to claim 1, wherein
the control unit is further configured to: determine that the downlink data is control information for the terminal device, and send the control information to the terminal device through the downlink communication module; or
the control unit is further configured to: determine that the downlink data is configuration information for the electrical gateway, and perform configuration on the electrical gateway according to the configuration information.

6. The electrical gateway according to claim 1, wherein the uplink network element is a server or a primary station, the uplink communication module is a wireless communication module, and the downlink communication module is a Zigbee communication module or a wireless communication module.

7. An electrical gateway, comprising:
an uplink communication module; and
a downlink communication module,
wherein the uplink communication module is connected to the downlink communication module;
wherein the downlink communication module is configured to communicate with a terminal device; and
wherein the uplink communication module is configured to: determine that downlink data sent by an uplink network element is obtaining terminal device information, send the terminal device information if the terminal device information is stored in the electrical gateway, and transmit the obtaining the terminal device information to the downlink communication module if the terminal device information is not stored in the electrical gateway.

8. The electrical gateway according to claim 7, wherein the terminal device is an electric meter, and the terminal device information is a reading of the electric meter.

9. The electrical gateway according to claim 7, wherein the uplink network element is a server or a primary station, the uplink communication module is a wireless communication module, and the downlink communication module is a Zigbee communication module or a wireless communication module.

10. An electrical gateway, comprising:
an uplink communication module; and
a downlink communication module,
wherein the uplink communication module is connected to the downlink communication module;

wherein the uplink communication module is configured to communicate with an uplink network element; and wherein the downlink communication module is configured to: determine that downlink data sent by the uplink network element is obtaining terminal device information, transmit the terminal device information to the uplink communication module if the terminal device information is stored in the electrical gateway, and send the obtaining the terminal device information if the terminal device information is not stored in the electrical gateway.

11. The electrical gateway according to claim 10, wherein the terminal device is an electric meter, and the terminal device information is a reading of the electric meter.

12. The electrical gateway according to claims 10, wherein the uplink network element is a server or a primary station, the uplink communication module is a wireless communication module, and the downlink communication module is a Zigbee communication module or a wireless communication module.

13. A communication method of an electrical gateway, comprising:

receiving downlink data sent by an uplink network element; and when determining that the downlink data is obtaining terminal device information, transmitting the terminal device information to the uplink network element if the terminal device information is stored in the electrical gateway; transmitting the obtaining the terminal device information to a terminal device if the terminal device information is not stored in the electrical gateway.

14. The communication method of the electrical gateway according to claim 13, wherein the determining that the downlink data is the obtaining the terminal device information comprises:

decapsulating the downlink data; and determining whether it is the obtaining the terminal device information according to the decapsulated downlink data.

15. The communication method of the electrical gateway according to claim 13, wherein the terminal device information is stored in the electrical gateway, the method further comprising:

encapsulating the terminal device information and transmitting the terminal device information to the uplink network element.

16. The communication method of the electrical gateway according to claim 13, wherein the terminal device information is not stored in the electrical gateway, the method further comprising:

encapsulating the terminal device information and transmitting the terminal device information to the terminal device.

17. The communication method of the electrical gateway according to claim 13, wherein the obtaining the terminal device information comprises obtaining a reading of an electric meter.

* * * * *